US011832539B2

(12) United States Patent
Zimmerman (10) Patent No.: US 11,832,539 B2
(45) Date of Patent: Dec. 5, 2023

(54) AGRICULTURAL IMPLEMENT WITH OPEN-ENDED ROLLING BASKETS

(71) Applicant: Raymond Zimmerman, Cantril, IA (US)

(72) Inventor: Raymond Zimmerman, Cantril, IA (US)

(*) Notice: Subject to any disclaimer, the term of this patent is extended or adjusted under 35 U.S.C. 154(b) by 295 days.

(21) Appl. No.: 17/392,953

(22) Filed: Aug. 3, 2021

(65) Prior Publication Data

US 2022/0046844 A1 Feb. 17, 2022

Related U.S. Application Data

(60) Provisional application No. 63/065,613, filed on Aug. 14, 2020.

(51) Int. Cl.
*A01B 29/04* (2006.01)
*A01B 33/10* (2006.01)
*A01B 33/02* (2006.01)
*A01C 5/06* (2006.01)

(52) U.S. Cl.
CPC .......... *A01B 29/048* (2013.01); *A01B 33/021* (2013.01); *A01B 33/103* (2013.01); *A01C 5/068* (2013.01)

(58) Field of Classification Search
CPC ... A01B 29/048; A01B 33/021; A01B 33/103; A01B 71/08; A01C 5/068; A01C 5/066; A01C 7/006
See application file for complete search history.

(56) References Cited

U.S. PATENT DOCUMENTS

| | | | | |
|---|---|---|---|---|
| 2,571,285 A | * | 10/1951 | Oehler | A01C 5/068 |
| | | | | 280/856 |
| 2,668,490 A | * | 2/1954 | Oehler | B60B 15/26 |
| | | | | 111/139 |
| 3,220,488 A | * | 11/1965 | Becker | A01B 39/08 |
| | | | | 172/551 |
| 7,806,197 B2 | * | 10/2010 | Steinlage | A01B 33/021 |
| | | | | 172/264 |
| 8,550,019 B1 | | 10/2013 | Reed | |
| 9,137,938 B2 | | 9/2015 | Zimmerman | |
| 9,516,803 B1 | * | 12/2016 | Rosenboom | A01C 5/066 |
| 9,769,971 B2 | * | 9/2017 | Hesla | A01C 7/203 |
| 10,375,872 B2 | * | 8/2019 | Huitt | A01B 29/048 |
| 10,881,042 B1 | | 1/2021 | Westlind | |
| 2013/0192855 A1 | * | 8/2013 | Meek | A01B 49/027 |
| | | | | 172/548 |
| 2018/0368310 A1 | | 12/2018 | Zimmerman | |

* cited by examiner

*Primary Examiner* — Adam J Behrens
*Assistant Examiner* — Blake E Scoville
(74) *Attorney, Agent, or Firm* — Goodhue, Coleman & Owens, P.C.

(57) ABSTRACT

An agricultural implement includes a row unit having a main body and a shank and a ground working tool operatively connected to the shank, the shank extending from the main body. The agricultural implement further includes an arm extending rearwardly from the main body of the row unit. There is a basket assembly including a first and a second rolling basket on opposite sides of an end of the arm, wherein the first and the second rolling basket are independently rotatable to break up clumps of soil. The first and the second rolling baskets each have an annular ring at an open outer end.

17 Claims, 10 Drawing Sheets

AGRICULTURAL IMPLEMENT WITH OPEN-ENDED ROLLING BASKETS

RELATED APPLICATIONS

This application claims priority to U.S. Provisional Patent Application No. 63/065,613, filed Aug. 14, 2020, hereby incorporated by reference in its entirety.

FIELD OF THE INVENTION

The present invention relates to agricultural implements. More particularly, but not exclusively, the present invention relates to an agricultural implement with rolling baskets such as may be used for strip tillage.

BACKGROUND

Strip tillage has generally been recognized as being beneficial from an environmental perspective, however despite advantages, various issues exist. Some of the attendant issues of a high-residue environment include compaction of the soil and uneven seedling emergence. These are significant issues which can adversely affect the early stages of plant growth which leads to adverse effects on crop performance and yield. What is needed is an improved strip till apparatus that addresses these issues.

SUMMARY

Therefore, it is a primary object, feature, or advantage of the present invention to improve over the state of the art.

It is a further object, feature, or advantage of the present invention to provide an agricultural implement which may be used in strip tillage applications.

It is a still further object, feature, or advantage of the present invention to limit the effects of soil compaction.

Another object, feature, or advantage is to assist in preparing soil in a manner to avoid uneven seedling emergence.

Yet another object, feature, or advantage is break up clumps in the soil.

A further object, feature, or advantage is to provide a rolling basket for breaking clumps in the soil while keeping the rolling basket clean form mud or other build-up.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, an agricultural implement is provided. The agricultural implement includes a row unit having a main body and a shank and a ground working tool operatively connected to the shank, the shank extending from the main body. The agricultural implement further includes an arm extending rearwardly from the main body of the row unit. There is a basket assembly including a first and a second rolling basket on opposite sides of an end of the arm, wherein the first and the second rolling basket are independently rotatable to break up clumps of soil. The first and the second rolling baskets each have an annular ring at an open outer end.

According to another aspect, an agricultural implement includes a row unit having a main body. The row unit has a shank and a ground working tool operatively connected to the shank, the shank extending from the main body. The row unit has an arm extending rearwardly from the main body of the row unit. The row unit has a first and a second rolling basket on opposite sides of the arm. The first and the second rolling baskets each have an annular ring and an opposite base and a plurality of spaced apart bars extending therebetween, with the annular ring at an outer open end. The base of the first and the second rolling baskets are each rotatably connected to the arm and wherein the first and the second rolling baskets are independently rotatable.

BRIEF DESCRIPTION OF THE DRAWINGS

Illustrated embodiments of the disclosure are described in detail below with reference to the attached drawing figures, which are incorporated by reference herein.

FIGS. 5-9 illustrate an embodiment of the roller basket assembly where scrapers are added. FIG. 10 is a view of the roller basket assembly showing a scraper.

DETAILED DESCRIPTION

Figure 1:
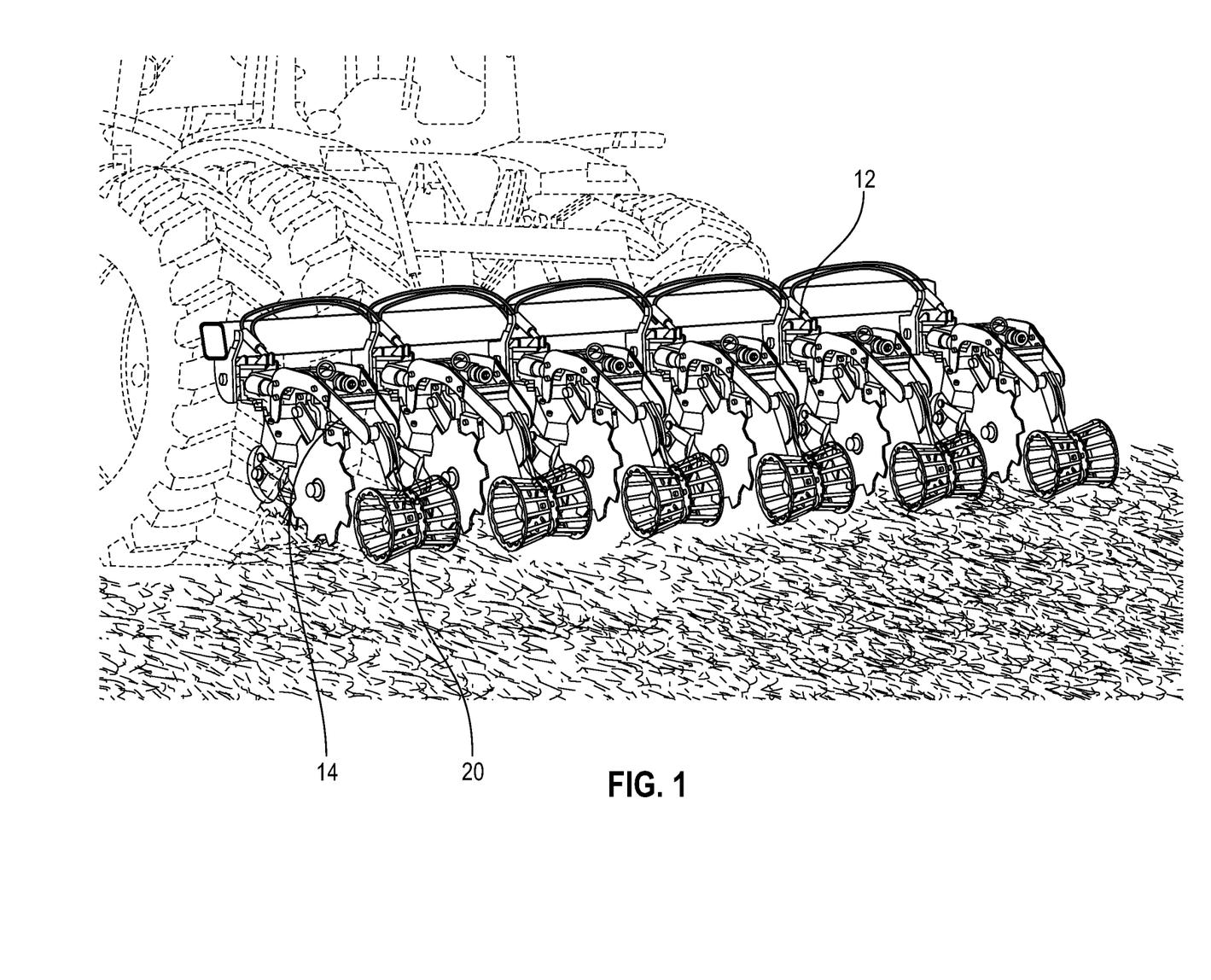
FIG. 1 illustrates an agricultural implement in a field, the agricultural implemented being connected to a tractor and having multiple row units.

FIG. 1 illustrates an agricultural implement including a tool bar 12 with a plurality of attached row units 14, the agricultural implement attached to a tractor. A roller basket attachment 20 is shown extending outwardly from the end of each row unit. As shown, there is a field with crop residue. Each row unit is used to till a strip such to form or build a rounded berm in which seed may be planted. Strip tillage in this manner is advantageous in minimizing the effects on the environment. Generally, each row unit includes a shank with a ground-working tool attached such as a sweep, shovel, or point. The roller basket attachment 20 trails other aspects of the row unit. The roller basket attachment assists in forming a seed bed by breaking clods into smaller sizes and chopping up debris so as to promote consistent early stage plant growth. The shank may be a high-clearance shank. The depth of the row unit may be controlled such as from a cab of the tractor through hydraulics in order to apply more force and therefore deepen a row. Each row unit may be configured to provide a self-centering pivot such as described in U.S. Pat. No. 9,137,938 to Raymond Zimmerman, hereby incorporated by reference in its entirety.

Figure 2:
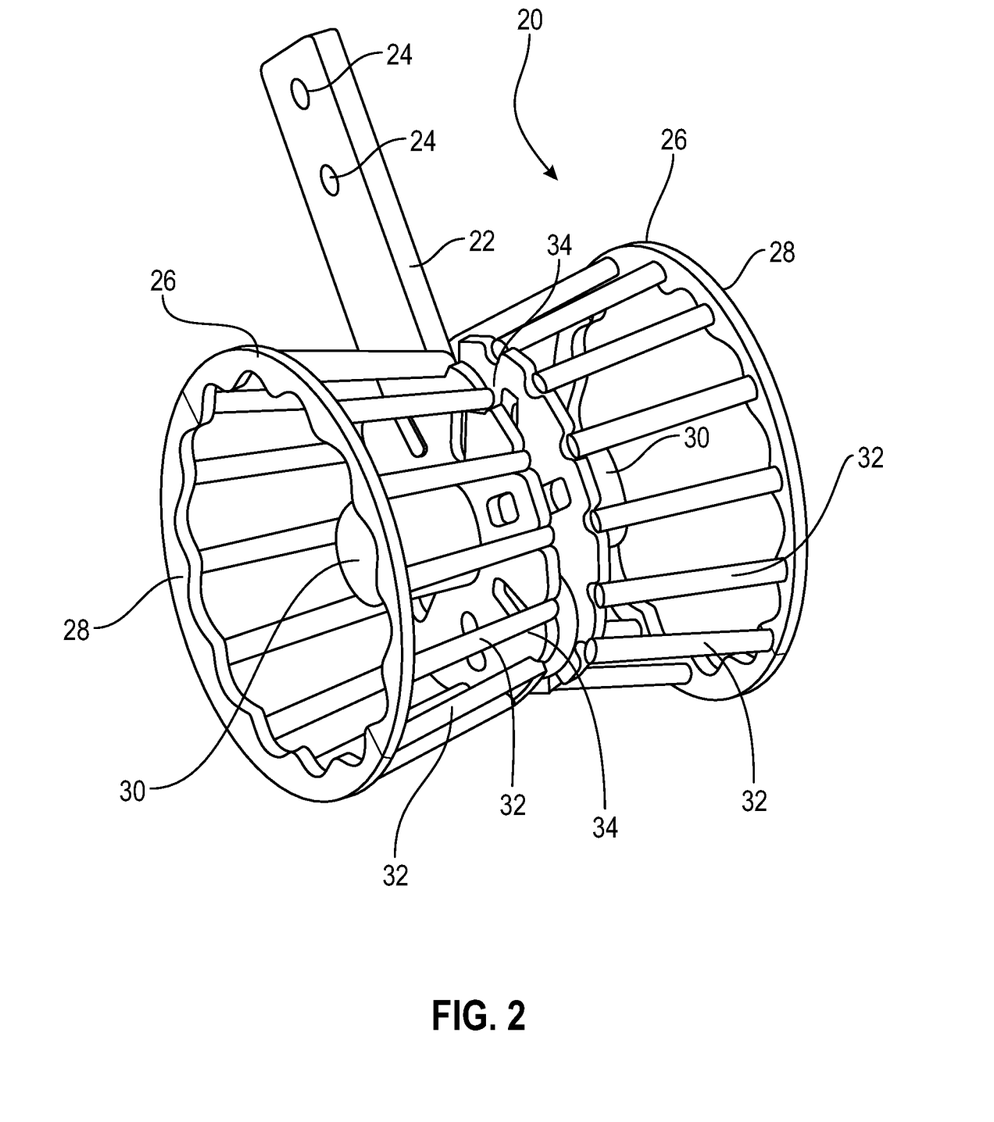
FIG. 2 is a perspective view of a roller basket assembly.

FIG. 2 illustrates one view of the roller basket assembly 20 in more detail. The roller basket assembly 20 includes first and second open-ended baskets 26 arranged back-to-back and operatively connected to an arm 22 with mounting holes 24 shown. Each of the open-ended baskets has an open-end formed from an annular ring 28. A plurality of bars 32 extend inwardly from the annular ring 28 towards a base 34. An arm 22 is positioned between the bases 34 of the open-ended baskets 26. Each of the open-ended baskets 26 has a center cap 30 which is centrally positioned.

The annular ring 28 has a larger circumference than the base 34 of each of the open-ended baskets 26. The surface area of the annular ring 28 may be reduced as shown in FIG. 2 by curving the surface of the annular ring inwardly between neighboring bars 32. Although not shown in the embodiment of FIG. 2, in some embodiments a scraper such as a paddle or blade may be positioned within each of the open-ended baskets 26 to assist in removing mud.

As each of the open-ended baskets 26 are rotatably connected to the arm, each of the open-ended baskets 26 rotates independently as the roller basket assembly is pulled along a soil. Due to the geometries and positioning of the roller basket, clumps in the soil are broken up and a berm is formed.

Figure 3:
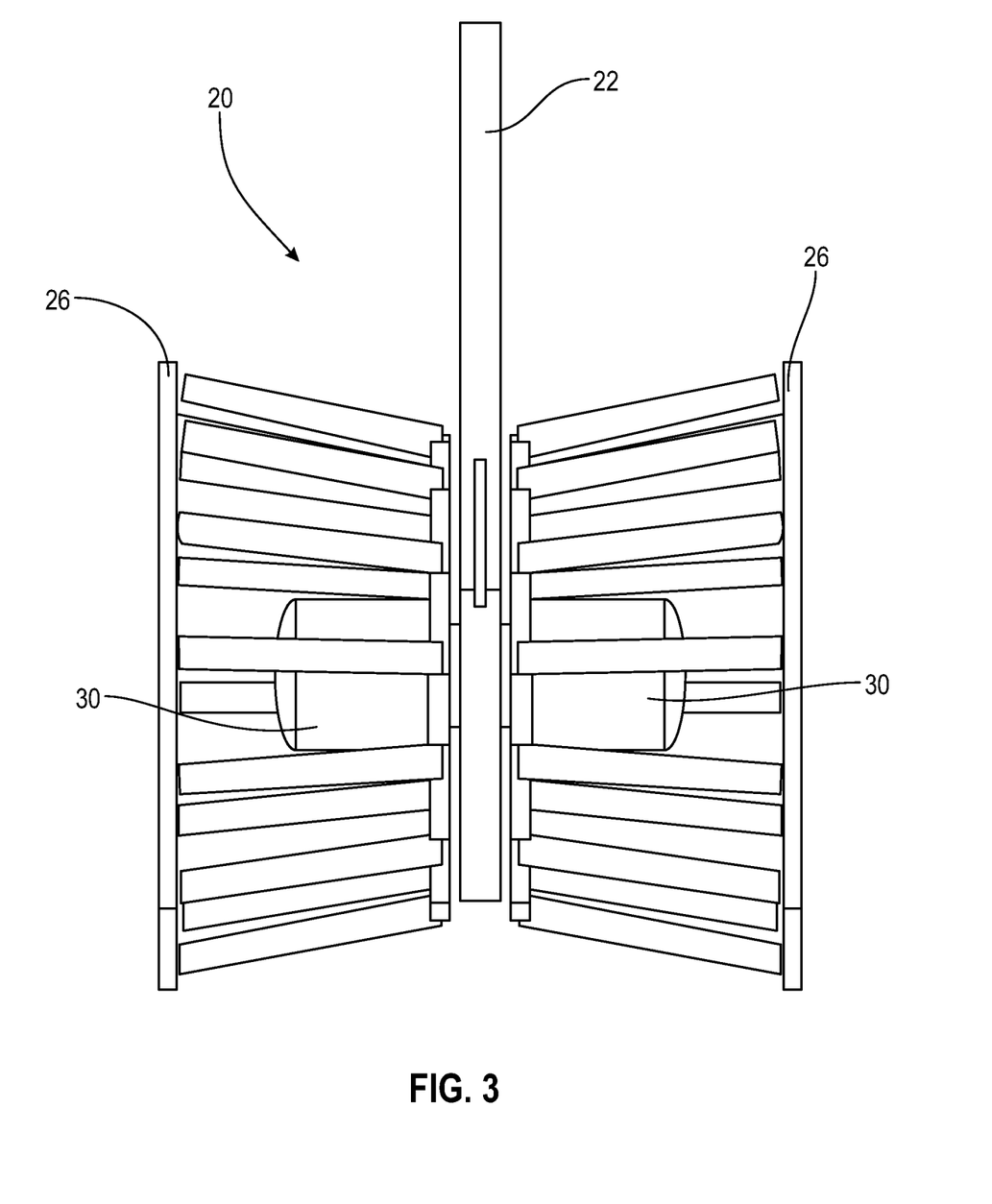
FIG. 3 is another view of the roller basket assembly.

FIG. 3 provides another view of the roller basket assembly 20. Note that that the annular ring 28 has a larger circumference than the base 34 of each of the open-ended baskets 26 and that each share a common central axis extending through a central portion of the center cap 30. Thus, the annular ring 28 extends below the base 34.

Figure 4:
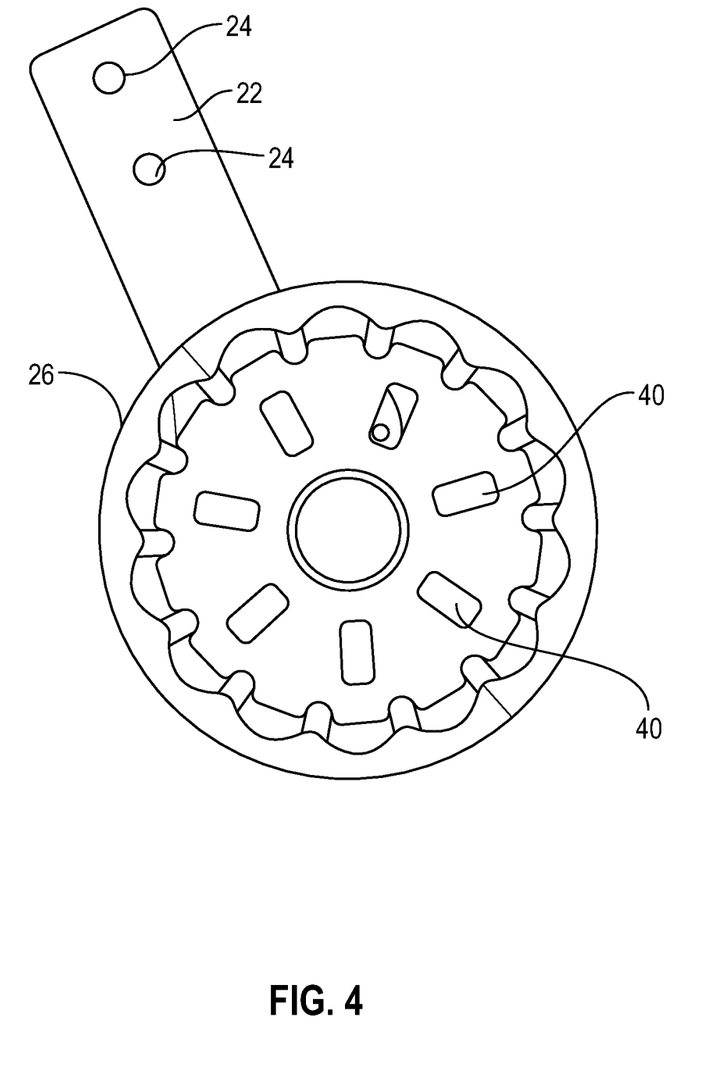
FIG. 4 is a further view of the roller basket assembly.
Figure 5:
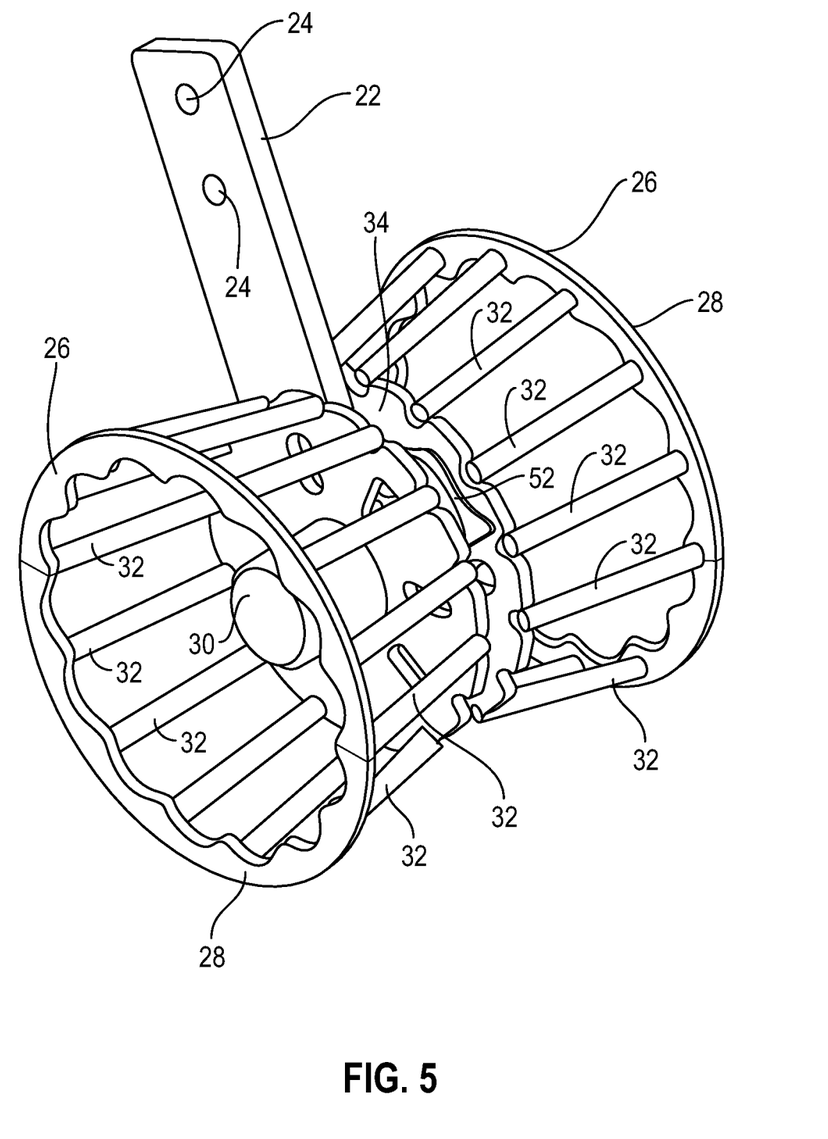
FIG. 5 is a perspective view of the roller basket assembly.

FIG. 4 provides another view of the roller basket assembly 20. There are apertures 40 in the base 34 to help avoid build-up of soil.

Figure 6:
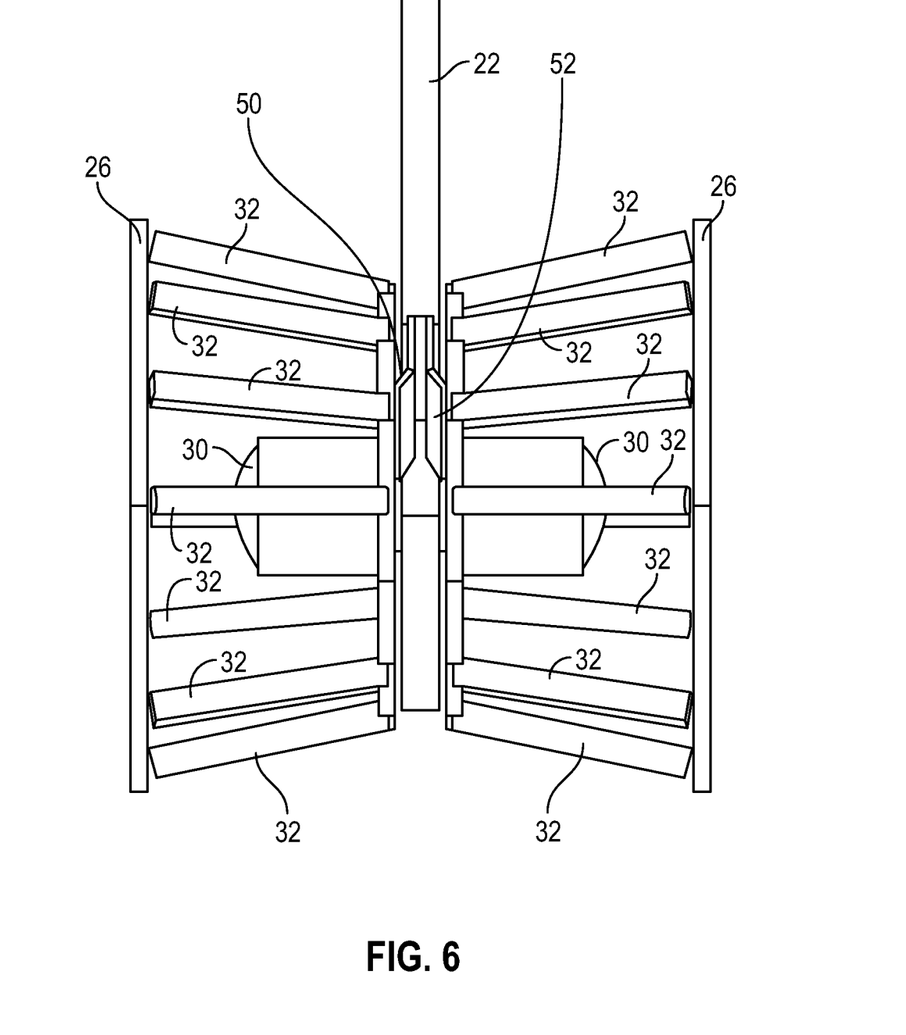
FIG. 6 is a view of the roller basket assembly.
Figure 7:
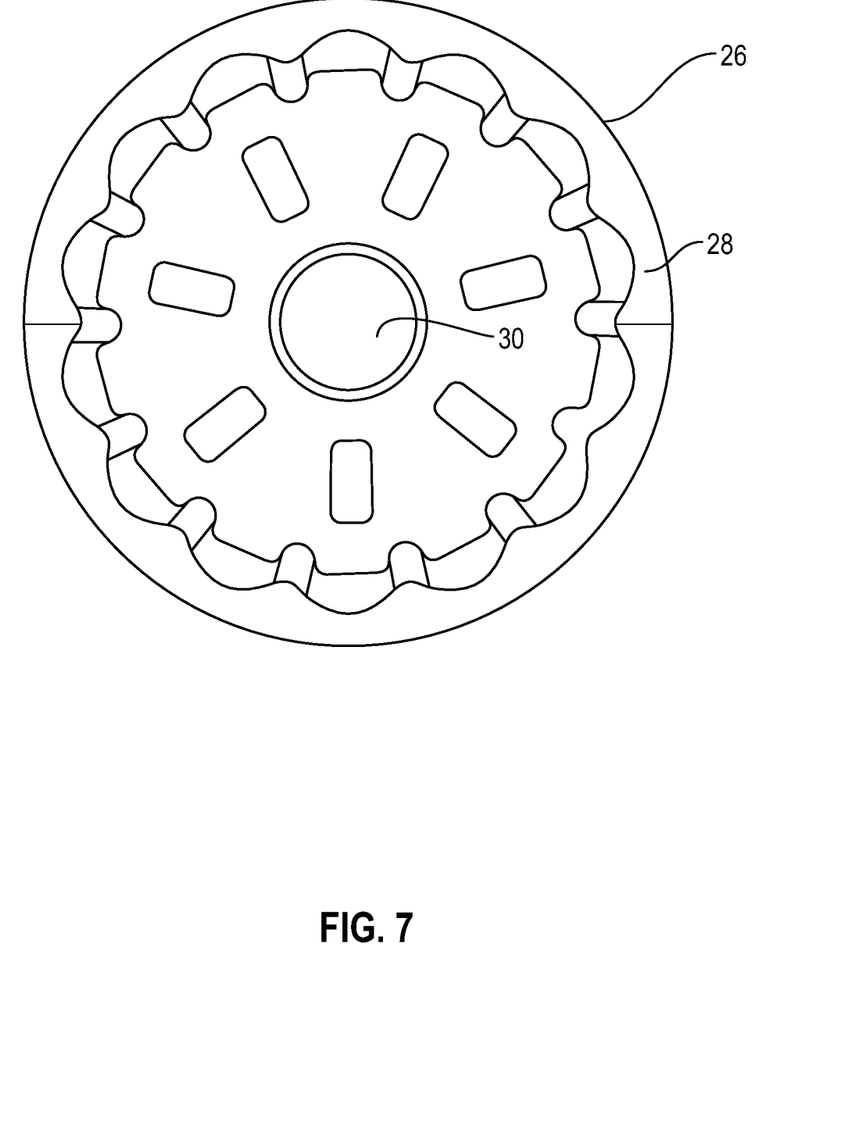
FIG. 7 is a side view of the roller basket assembly.
Figure 8:
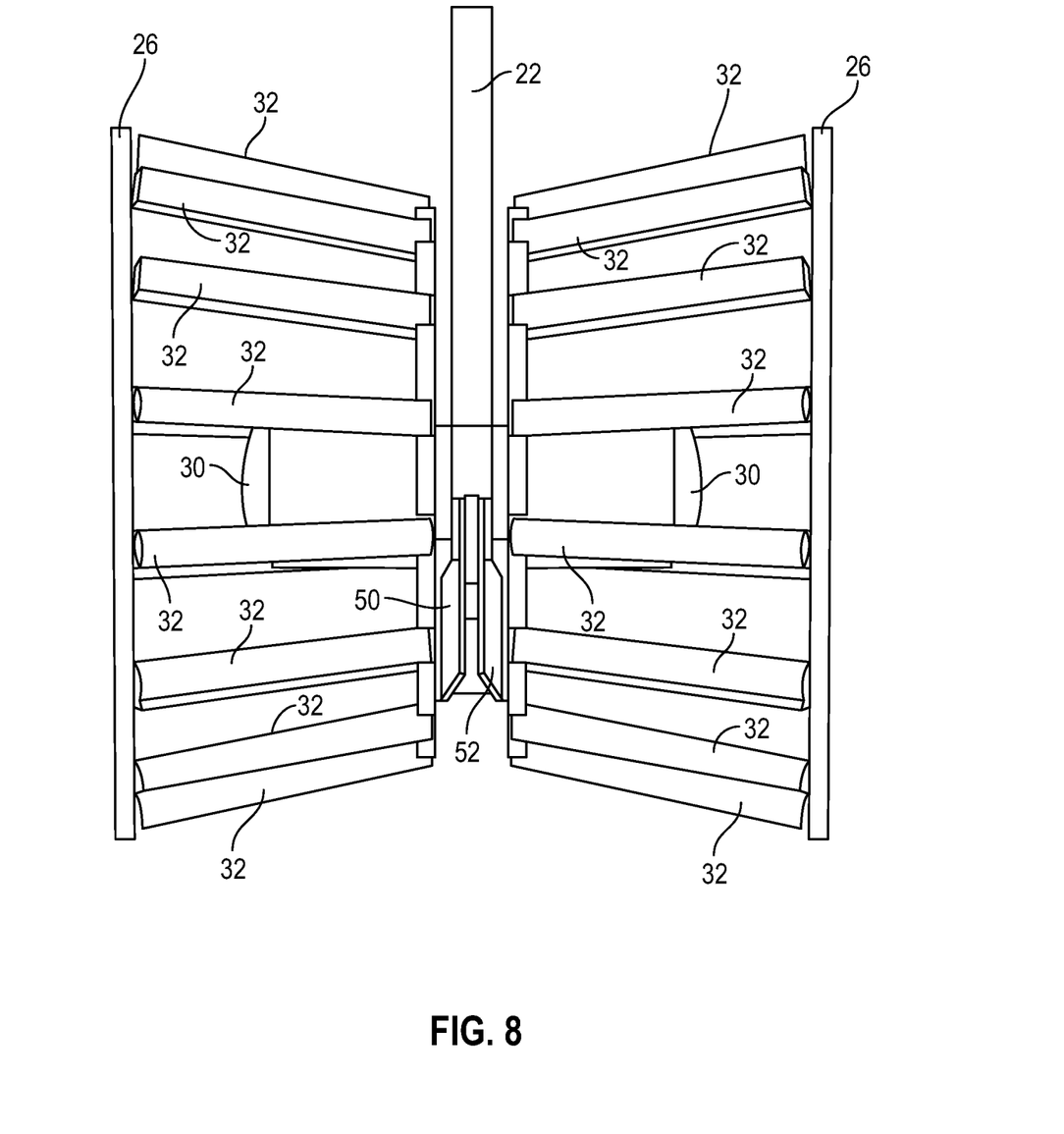
FIG. 8 is another view of the roller basket assembly.
Figure 9:
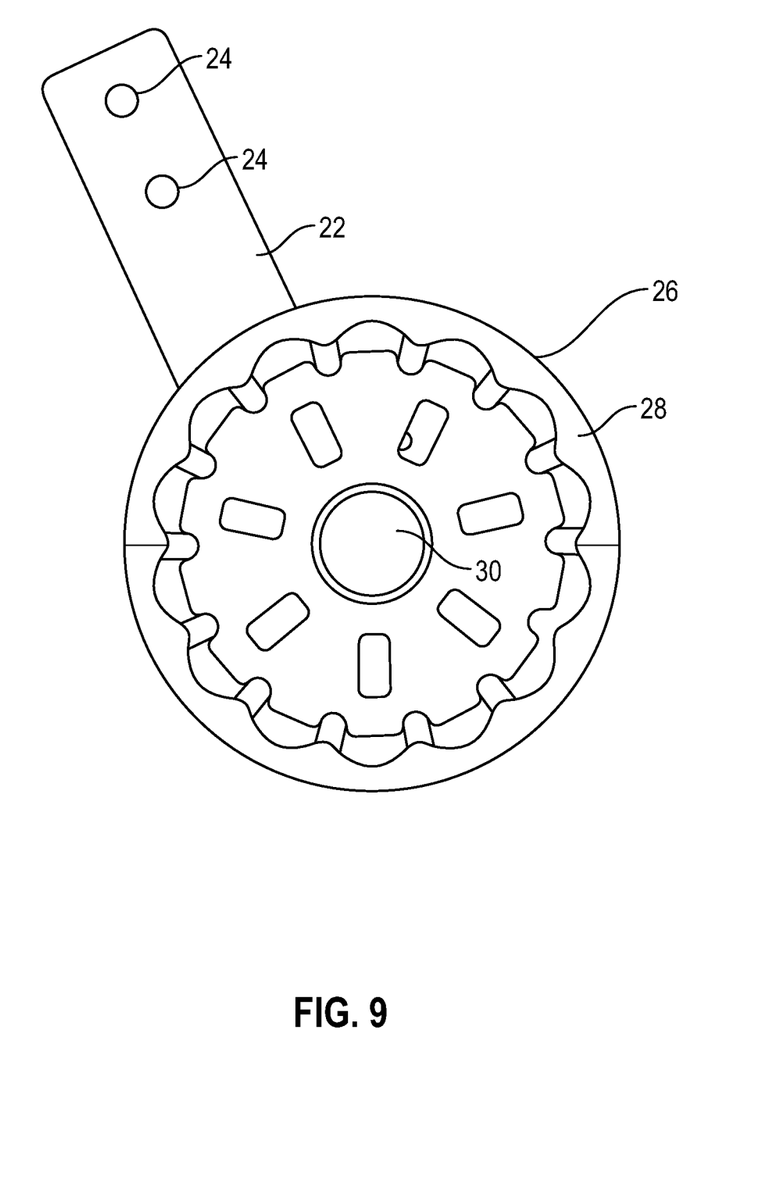
FIG. 9 is another side view of the roller basket assembly.

FIG. 5-9 illustrate an embodiment of the roller basket assembly where scrapers are added in a central position. This is best shown in FIG. 6. Scrapers 50, 52 are positioned between the rolling baskets to assist in removing build-up of soil.

Figure 10:
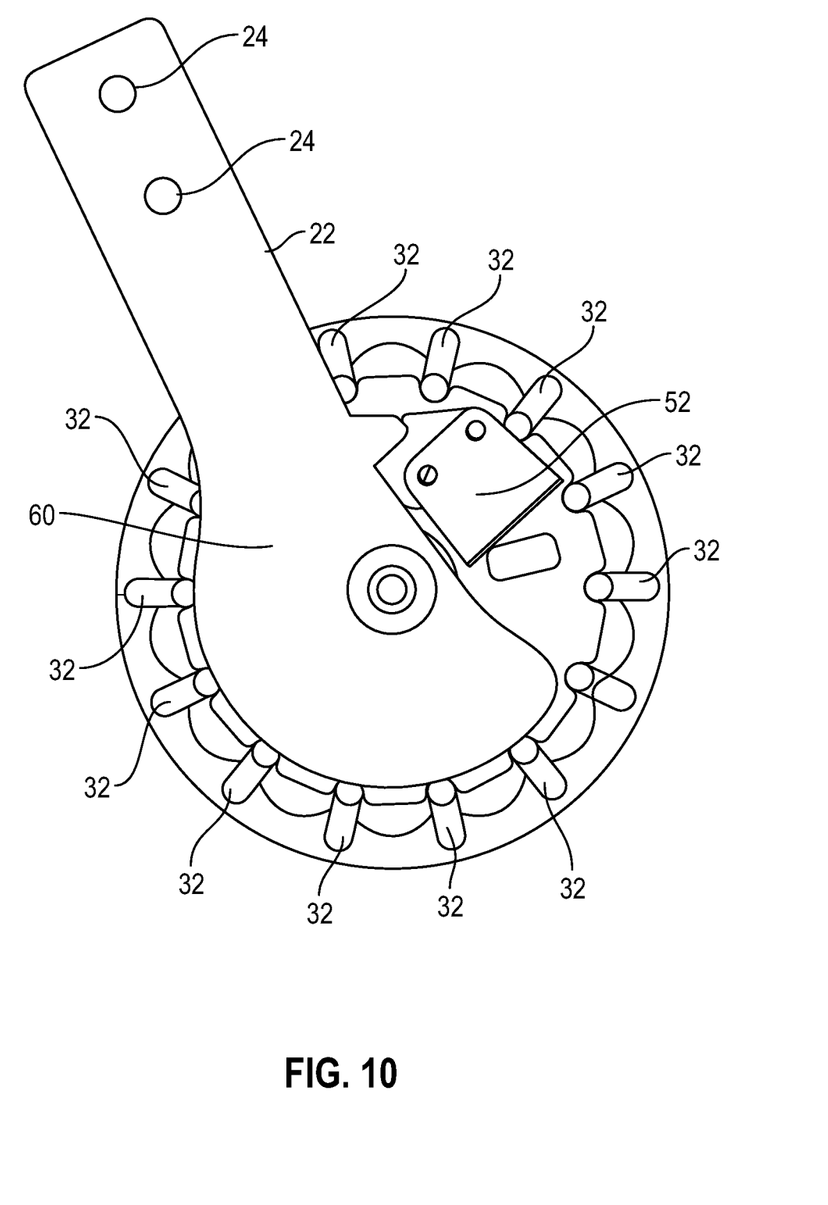
FIG. 10 illustrates the roller basket assembly showing basket mounting.

FIG. 10 illustrates the roller basket assembly showing basket mounting 60.

The invention is not to be limited to the particular embodiments described herein. In particular, the invention contemplates numerous variations in the structure of the roller baskets, the manner in which independent rotation is imparted, the geometry of the annular ring, the type of bars used and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. An agricultural implement, comprising:
    a row unit having a main body;
    a shank and a ground working tool operatively connected to the shank, the shank extending from the main body;
    an arm extending rearwardly from the main body of the row unit and terminating at a rearward end;
    a basket assembly comprising a first and a second rolling basket on opposite sides of the rearward end of the arm, wherein the first and the second rolling basket are independently rotatable and operate independently to break up clumps of soil;
    wherein the first and the second rolling baskets each comprise a continuous annular ring at an open outer end and a plurality of bars extending inwardly from the annular ring towards a base;
    wherein the rearward end of the arm is positioned between the base of the first rolling basket and the base of the second rolling basket.

2. The agricultural implement of claim 1 wherein the base of each of the first and the second rolling baskets is rotatably connected to the arm.

3. The agricultural implement of claim 2 wherein the bars are positioned around the annular ring of each of the first and the second rolling baskets.

4. The agricultural implement of claim 3 wherein a circumference of the annular ring is greater than a circumference of the base for each of the first and the second rolling baskets.

5. The agricultural implement of claim 4 wherein the annular ring and the base are aligned along a common central axis for each of the first and the second rolling baskets.

6. The agricultural implement of claim 5 further comprising a plurality of apertures in the base of each of the first and the second rolling baskets.

7. The agricultural implement of claim 6 wherein the annular ring curves inwardly between bars.

8. The agricultural implement of claim 1 further comprising a toolbar and wherein the row unit is attached to the toolbar.

9. The agricultural implement of claim 8 further comprising a plurality of row units attached to the toolbar and wherein the row unit is one of the plurality of row units.

10. The agricultural implement of claim 9 further comprising at least one scraper positioned between the first rolling basket and the second rolling basket.

11. An agricultural implement, comprising:
    a row unit having a main body;
    the row unit having a shank and a ground working tool operatively connected to the shank, the shank extending from the main body;
    the row unit having an arm extending rearwardly from the main body of the row unit and terminating at a rearward end;
    the row unit having a first and a second rolling basket on opposite sides of the rearward end of the arm;
    wherein the first and the second rolling baskets each comprise a continuous annular ring at an open outer end and an opposite base with a plurality of spaced apart bars extending between the continuous annular ring and the opposite base;
    wherein the base of the first and the second rolling baskets are each rotatably connected to the arm and wherein the first and the second rolling baskets are independently rotatable and operate independently to break up clumps of soil.

12. The agricultural implement of claim 11 wherein a circumference of the annular ring is greater than a circumference of the base for each of the first and the second rolling baskets.

13. The agricultural implement of claim 12 wherein the annular ring and the base are aligned along a common central axis for each of the first and the second rolling baskets.

14. The agricultural implement of claim 13 further comprising a plurality of apertures in the base of each of the first and the second rolling baskets.

15. The agricultural implement of claim 14 wherein the annular ring curves inwardly between bars.

16. The agricultural implement of claim 15 further comprising a toolbar and wherein the row unit is attached to the toolbar.

17. The agricultural implement of claim 16 further comprising a plurality of row units attached to the toolbar and wherein the row unit is one of the plurality of row units.

* * * * *